Nov. 7, 1967  E. PAGE  3,351,366
INTERLOCKING JOINT
Filed Oct. 24, 1965
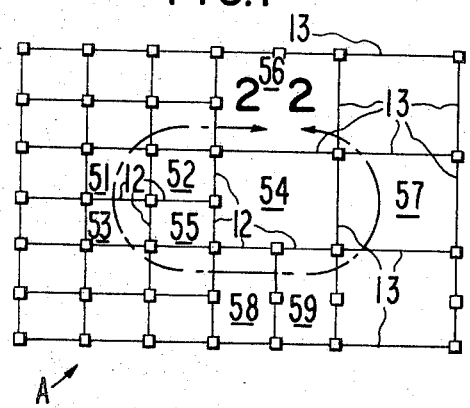
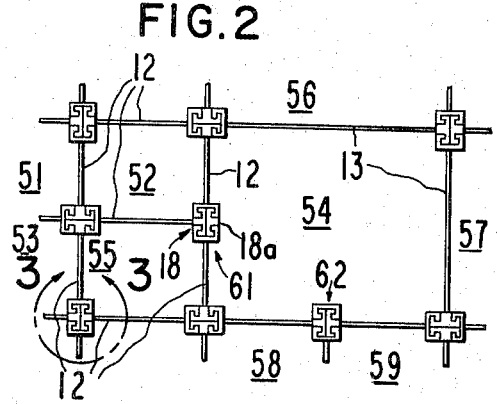
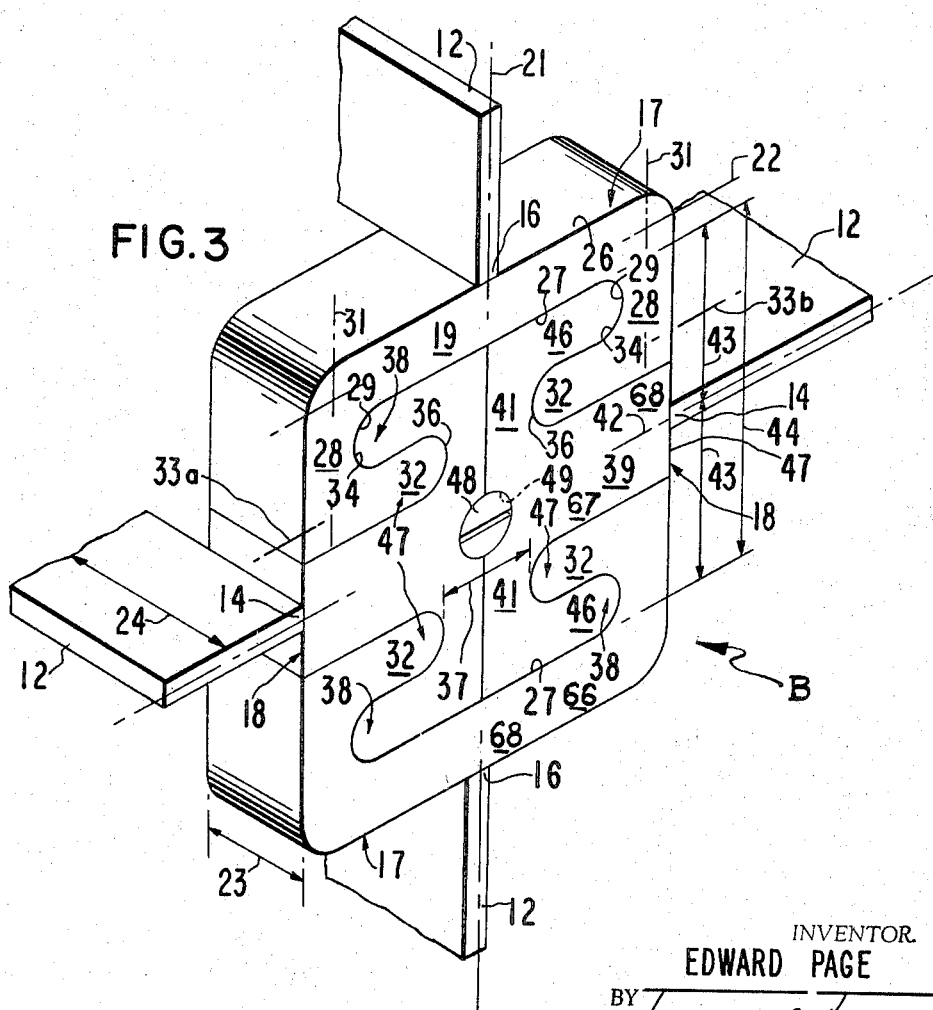
INVENTOR.
EDWARD PAGE
BY Townsend and Townsend
ATTORNEYS

United States Patent Office 3,351,366
Patented Nov. 7, 1967

3,351,366
INTERLOCKING JOINT
Edward Page, Walnut Creek, Calif., assignor to M. Greenberg's Sons, San Francisco, Calif.
Filed Oct. 24, 1965, Ser. No. 504,577
6 Claims. (Cl. 287—189.36)

This invention relates to an interlocking joint for interconnecting two or more structural members; and more particularly my invention embodies an interlocking joint whose operative elements may be limited to two basic shapes which, when positioned to form the joint, comprise an integral structural unit.

I am familiar with a number of devices which provide for the interconnection of members such as horizontal shelving and intermediate vertical supports. In general such devices require numerous separate pieces to form a connection, and hence are relatively time consuming and costly to install.

I am also familiar with structural systems using interlocking shapes such as I beams in which the lateral flanges of one member fit into the bosom of another member with hook-like extensions or serifs at the flange extremities holding the joint in a locked condition. However, these structural systems are generally not adaptable for separation, for example into four separate elements in a manner which permits removal or omission of one or two of the members without altering the integrity of the joint connection itself. Moreover, the geometry of such structural systems do not lend themselves generally to a modular member system whereby a plurality of identical members may be interconnected to form a variety of configurations, without the use of relatively complex composite sections which are difficult to fabricate and assemble.

In the permanent storage of cremains within the chambers of a columbarium, the systems with which I am familiar generally employ a complex lattice of horizontal and vertical members which are adapted to accommodate shelves to support an urn or other container housing the cremains. Such a "Jungle Jim" arrangement has several disadvantages. A number of individual parts must be prepared and assembled thus increasing costs and assembly time; and in those systems in which the urn is fitted into the lattice, the unoccupied portions of the structures impose an unsightly and inappropriate skeletal appearance.

It is an object of this invention to provide a simple interlocking joint that may be used to interconnect the ends of an array of structural members such as rods, bars, shelves, or the like.

More specifically, it is an object to provide an interconnecting joint comprising a pair of oppositely facing C-shaped elements and a pair of oppositely facing T-shaped elements. The T-shaped elements are oriented with the crossbars of the T in contact with each other, and the C-shaped elements are arranged to have the branches or necks and nodes of the C surrounding and interlocking the ends of the crossbars and lobes of the T. In this manner each of the elements is maintained in a structurally integral unit in fixed position.

A feature and an advantage of this invention is that an interconncting joint is provided having a minimum number of individual pieces, thereby facilitating prefabrication, reducing the amount and costs of required inventory, and the time required for field installation.

Another object is to provide my novel interconnecting joint with a tapered cap screw for insertion between the crossbars of adjacent T-shaped elements. In this way the inherent clearance which exists between the T-shaped elements with each other and the interlocking C-shaped elements may be reduced to provide a more rigid structure.

A feature and an advantage of the foregoing object is that the cumulative error which causes increasing structural instability from joint to joint in an array of supported members having many tiers may be minimized. Having this feature, my invention may be employed in a greater number of structures including those where stiffness and maximum structural integrity are desirable or necessary.

A more specific object of this invention is to provide the elements of my novel joint along the edges of shelves and vertical members to support such members in a structural, multitiered array.

It is also an object of this invention to provide a novel urn and niche construction for the storage of cremains in the chamber of a columbarium.

Numerous other objects, features and advantages will become apparent to one skilled in the art upon a reading of the following specification and by referring to the accompanying drawing in which the same characters of reference refer to similar intems in each of the several figures.

Turning now to the drawings, FIG. 1 is an elevational view showing an array of shelves constructed by means of joints embodying my invention;

FIG. 2 is an enlargement of the portion of FIG. 1 surrounded by the interrupted line 2—2 and shows the joints of my invention in somewhat greater detail;

FIG. 3 is an enlarged isometric of one of the joints shown in FIG. 2.

To explain my invention I shall illustrate its use in reference to an array of shelves and vertical supports as indicated at A in FIG. 1, although it is understood that my novel joint is not limited to the interconnection of items such as shelves 12 and 13, which are multiple lengths of 12; my invention may also be used to connect other types of structural members, for example rods, bars, and the like.

The invention is best understood by referring to FIG. 3 where the novel device is shown supporting ends 16 of typical members 12 in the vertical plane. It is understood that members 12 and 13 may be interchanged or that all the members shown may be of the same type without altering the joint itself. Members 12 and 13, and various portions of my novel interlocking joint, may be fabricated from a variety of suitable materials including metals such as steel, aluminum, bronze, or the like, or a suitable non-metallic material such as wood, plastic, or the like. Moreover, the members being interconnected and the joint itself may be of different materials suitably adhered to one another by welding, brazing, adhesives, or the like. Generally the joint will be made from the same material as the member being supported, and in certain cases a portion of the joint may even be formed integrally with the member by such well-known processes as extruding or casting.

My novel interlocking joint is comprised basically of a pair of C-shaped elements indicated at 17 secured to ends 16 of members 12, and a pair of T-shaped elements indicated at 18 secured to ends 14 of members 12. Since both of the C-shaped elements are substantially identical, as are the T-shaped elements, a detailed description of one applies equally to the other of the same type.

The C-shaped element indicated at 17 in the upper portion of FIG. 3 includes spine or body portion 19 which extends for an equal distance on each side of joint center line 21 in the direction of spine or body longitudinal axis 22. The thickness of the spine and other portions of the joint, shown by dimension 23, is normally uniform. However, such uniformity is not critical and the joint may extend along the entire width 24 of a member such as shelf 12. The only requirement in this respect is that the joint should have sufficient depth 23 to assure proper structural rigidity when finally assembled for the particular application.

As exemplified in FIG. 3, member 12 is suitably secured at about the center of spine 19 to posterior surface 26 opposite interior surface 27. In addition the C-element includes branch or neck portions 28 which extend outwardly from each end of spine 19 with longitudinal axes 31 substantially at right angles to the plane of surface 27. The branch or neck portions are shaped to terminate in nodes 32 having longitudinal axes 33a and 33b in alignment with each other. Although in the example that I show in FIG. 3 the interior surfaces of the branches and nodes have curved fillet sections 29 and 34, respectively, and rounded node ends 36, this is for convenience of fabrication and is not a critical limitation. If desirable, the fillets and rounded surfaces could be made a series of flats or sharp-cornered. Moreover, node 32 could be wider at the rounded or free end than its body portion. The free ends of the nodes are spaced apart a distance shown by dimension 37 which is selected to accommodate the thickness of two T-shaped elements as indicated at 18 when placed end to end and assembled in normal operating position. The recess indicated at 38, formed at each end of the C-shaped elements by node 32, the inner surface of branch 28, and the adjacent inner surface portion of spine 19, is shaped to fit snugly around lobe 46 of the T-shaped element when the joint is assembled, thereby preventing separation of the joined, adjacent T-shaped elements.

As shown in FIG. 3, the T-shaped elements of my invention indicated at 18 include stem 39 and crossbar 41 which is secured at its mid-section to the stem. The crossbar extends for a distance equal to dimension 43 on each side of stem center line 42 for a total distance equal to dimension 44 between opposite interior spine surfaces 27. In the example of my invention as shown, crossbar 41 is made integral with stem section 39, as by casting, extruding, or other suitable fabrication, but the entire element may be a composite section made of various subsections; the same type of composite construction may be practiced in the fabrication of the C-shaped elements.

Each end of crossbar portion 41 has extending therefrom a lobe 46 which may also be characterized as the serifs of the T formed by crossbar 41 over the top of stem 39. The lobes extend generally parallel to longitudinal axis 42 of stem 39 toward stem base 47. The lobes shown have rounded ends and a fillet at the inside intersection with crossbar 41, but other configurations may be utilized depending upon the nature of the material and fabrication process. It is necessary only that lobe 46 be shaped to provide a reasonably snug fit within the recess indicated at 38 of the C-shaped elements as indicated above. The notch indicated at 47, formed between the inside surface of lobe 46 and the adjacent portions of crossbar 41 and stem 39, should be shaped to provide a snug fit with node 32 of the C-shaped elements.

In FIG. 3 my novel interlocking joint is shown in its assembled and operative form in accordance with the foregoing description. Various vertical and horizontal members 12 which may be secured to the elements of my novel joint are held in rigid fixed relative position by virtue of the arrangement wherein opposing T-shaped elements are prevented from separation by the locking action of recesses 38 of the C-shaped elements which surround three side of lobe portions 46 formed at each end of crossbars 41. The C-shaped elements are in turn restrained by interlocking notches 47 of the T-shaped elements which surround three sides of nodes 32 of the C-shaped elements. To obtain an even tighter connection than that which has been described thus far in the specification, I have found it useful to provide tapered cap screw 48 and cooperating tapered threads 49 formed at the split line and penetrating at right angles thereto between and into the interfaces of the T-shaped elements indicated at 18. Tapered cap screw 48, which may be of the self-tapping type and also provided with a head that will fit flush with respect to the outer surfaces of the T-shaped elements, when screwed into place forces the T-shaped elements slightly apart from each other. In this way the interlocking nodes 32 and lobes 46 are forced deeper into notches 47 and recesses 38, respectively, to decrease inherent internal fabrication clearance. By thus tightening all of the joints in an array of members being interconnected, I am able to provide a relatively rigid structure. This is especially desirable, and sometimes necessary, in a multiple array of interlocking shelves as shown in FIG. 1 which might otherwise tend to be somewhat unstable due to the cumulative effect of looseness from one joint intersection to the other.

Although as I have mentioned earlier, my novel interlocking joint may be utilized in a number of different structural applications, for example in the modular fabrication of shelving units and the like, I have found it particularly applicable in the construction of a novel modular urn and niche assemblage for the interment of cremains within the chambers of a conventional columbarium. When my invention is thus applied, the modular character of the interconnected members made possible by my invention is particularly useful. For example, as can be seen in FIGS. 1 and 2, the open intervals between horizontal shelves and vertical sidewalls may be selected in a variety of widths and heights. The smallest modular member used as the bottom shelf, sidewalls and top shelf may provide what is commonly referred to as an urn in a novel form and is exemplified by cavities 51, 52, 53, 55 and others. Units having twice the width and length may also be provided either by the use of long members 13, which are twice as long as members 12, or by connecting together two smaller modular members 12. Such double-sized units or compartments are shown at 54, 56, 57, etc., and are usually referred to as niches, the distinction being that niches house containers with cremains while urns themselves house the wrapped cremains directly. Intermediate-sized enclosures such as 58 and 59 may be achieved by using double length vertical members 13 (or a pair of members 12 joined together) and members 12 horizontally. It is understood, of course, that such intermediate size rectangularly-shaped enclosures may also be provided with the long side oriented horizontally. A number of other sizes and shapes may be provided by the use of my novel modular arrangement; for example, it has been found convenient to provide niches having a side three times the length of modular member 12 when the latter is in the neighborhood of about 4" long.

As noted above in distinguishing urns and niches, the smaller compartments such as 51, 52, etc., may be used directly to house cremains appropriately sealed in plastic bags or the like. In such instance the urn opening nearest the observer will be closed off with a proper bronze or other suitable metallic material face cover. The cover may be secured at each of its corners to the urn structure by means of the cap screw expander 48 already mentioned for use in respect to tightening each joint. The larger accommodations such as niches 54 are generally used where the cremains are themselves housed in special containers which may be viewed after interment. In such instance the niche may be left open or shielded by means of glass or other suitable transparent material which may be secured to the face of the niche by suitable known techniques including the use of the cap expander.

It is understood of course that either the niches, the urns, or the intermediate-size openings 58 and 59 may be closed off or left open in a variety of arrangements consistent with propriety and the particular usage under consideration.

At least two other features of my invention which relate to its modularity should be noted, and these are advantageous not only in respect to the specific application for columbaria as mentioned above but also in other fields. As can best be seen in FIG. 2, the entire array of shelves to form various sized compartments is accomplished by means of members 12 and 13 having a C-shaped element 17 at one end and a T-shaped element 18 at the other end. No other types of members are required; for example, members having a C-shaped element at both ends or a T-shaped element at both ends may be avoided provided that the number of members defining any one compartment is an even number. Thus, I am able to prefabricate and inventory units embodying my invention in one size and type only, thus requiring only one die, pattern, or other fabrication expedient for each length of unit having integral joint elements. Indeed, if it were desirable I could provide only one modular unit, the smallest that might be desirable, and fabricate all longer length members from the one minimum modular member. However, I have found it preferably to provide at least two sizes since it may be desirable to have a shelf or other member that is entirely smooth throughout its span, i.e. does not employ two or more shorter members with a joint or joints connecting the members.

Another feature of my invention which should be noted is the connection used to splice two members together or one forming an intersection of less than four members such as shown at 61 in FIG. 2. In that interlocking joint, two vertical members 12 are joined to form one side of a niche whose opposite wall is defined by member 13. At the same time adjacent compartments 52 and 55 are typical urns and common horizontal member 12 between the urns is also supported at one end thereof by connection 61. Although no horizontal element extends to the right of the joint at 61, the joint to be structurally complete should have at least a pair of T-shaped elements facing each other. One of these, element 18, is secured to the righthand end in FIG. 2 of the aforementioned member 12. The other T-shaped element, element 18a, unattached to any other member, is also provided and is similar in all respects to other T-shaped elements except that the base of the stem, surface 47, is completely smooth and forms a smooth surface with the external portions of the nodes of the adjacent C-shaped elements. Although in this example the element without a member connected to it was one of the T-shaped type, a similar expedient may occur when the connected element is of the C-shaped type as seen by the joint indicated at 62. Here again the joint requires the second C-shaped element to complete the interlocking joint and provide structural integrity even though the element is not connected to a member to be supported. In this case as before, a C-shaped element is provided to complete the joint with a smooth surface which is aesthetic and pleasing to the eye.

In the application of my invention to urns and niches for columbaria, it will be apparent to those familiar with the art that I have eliminated the "Jungle Jim" type of arrangement of skeletal frames in which shelves and/or separate urns may be supported so commonly encountered with certain prior art systems with which I am familiar. Instead, I provide a relatively simple modular system which provides for smooth and pleasing compartments that may serve either as urns or niches in a variety of shapes and sizes with a minimum number of assembly pieces and items of inventory. Moreover, my invention gives a finished and restful appearance even to installations provided with units for future use but which are unoccupied.

My novel interconnecting joint may also be fabricated with component portions of the C- and T-shaped elements comprising almost identical basic shapes. To illustrate, attention is directed to the quarter section of the joint indicated at B in the region at the lower right hand portion of FIG. 3 bounded by centerlines 21 and 42. Half portion 66 of the C-shaped element shown may be made identical in all respects to half portion 67 of the T-shaped element with which it is shown interlocked, with the exception of the small quarter circular section taken away by cap screw expander 48 at one corner of the T-shaped element. Half portions 66 and 67 may be described as L-shaped sub-elements having trunks 68. The remaining portions may be referred to by the same terminology as adopted above in respect to the C-shaped element, and these are not repeated here. Two L-shaped sub-elements may be suitably secured to each other along adjacent back side surfaces of trunks 68 to form a T-shaped element, or may be formed as an integral unit. Two other L-shaped sub-elements may be suitably secured to each other along the base end surfaces of their respective trunks to form a C-shaped element, provided the sub-elements are of right hand and left hand orientation in respect to each other; or the sub-elements may be fabricated integrally. The invention otherwise may be described in the same manner as set forth above.

Although the foregoing specification sets forth my invention in an embodiment with some detail, this has been done for purposes of clarity of illustration and not to impart particular limitations to the scope of my invention. It is understood that numerous mechanical variations of my invention may be practiced within the spirit thereof and scope of the appended claims.

What is claimed is:

1. An interlocking joint to connect the ends of at least two members comprising in combination: a pair of T-shaped elements each comprising a stem portion with one end adapted for attachment to one end of one of said members, a crossbar secured at the mid-section thereof to the other end of the stem and perpendicular thereto, first and second lobes each formed at an opposite end of said crossbar and extending in a direction parallel to said stem and toward the base thereof, and a notch defined on each side of said stem by said lobe and adjacent portions of said crossbar and stem; and a pair of C-shaped elements each comprising a spine having an interior surface and a posterior surface formed on opposite sides of said spine, said posterior surface adapted for attachment to one end of another of said members to be connected, first and second branches each secured to said interior surface at the opposite ends of said spine and extending in a direction generally normal to the interior surface, first and second nodes each formed at one ends of each of said branches in longitudinal alignment with each other, the free ends of said nodes facing each other and spaced apart a distance equal to about twice the thickness of the crossbar of said T-shaped element measured parallel to the longitudinal axis of said stem, and a recess defined at each end of said spine by each of said nodes, and adjacent portions of one of said branches and spine, a node of a C-shaped element shaped to fit in a notch formed in one of said T-shaped elements, and the lobe associated with said notch of the one T-shaped element shaped to fit in the recess associated with said node formed in such C-shaped element, said pair of T-shaped elements being positioned with crossbars touching and the longitudinal axes of said stems and lobes in co-axial alignment, and said pair of said C-shaped elements positioned with each node nested in a separate one of said notches.

2. The interlocking joint in accordance with claim 1 and means mounted between the touching portions of the crossbars of said T-shaped elements to force the T-shaped elements away from each other and cause said lobes and nodes to fit more snugly within said recesses and notches.

3. The interlocking joint in accordance with claim 1 and a tapered cap screw cooperatively threadedly connected to the touching portions of the crossbars of said T-shaped elements with the longitudinal axis of said cap screw intersecting the plane of the face of said joint.

4. A member with elements for an interlocking joint comprising: a T-shaped element comprising a stem portion having a base end secured to one end of said member, a crossbar secured at the mid-section thereof to the other end of the stem and perpendicular thereto, a lobe formed at opposite ends of said crossbar extending in a direction parallel to said stem and toward the base thereof, and a notch defined on each side of said stem by said lobe and adjacent portions of said crossbar and stem; and a C-shaped element comprising a spine having an interior surface and a posterior surface formed on opposite sides of said spine, said posterior surface secured to the other end of said member, first and second branches each secured to said interior surface at the opposite ends of said spine and extending in a direction generally normal to the interior surface, first and second nodes formed at the ends of said branches away from said surface and in longitudinal alignment with each other, the free ends of said nodes facing each other and spaced apart a distance equal to twice the thickness of the crossbar of said T-shaped element measured parallel to the longitudinal axis of said stem, and a recess defined at each end of said spine by said nodes and adjacent portions of said branches and spine, a node of a C-shaped element being shaped to fit in a notch formed in a T-shaped element, and the lobe of a T-shaped element shaped to fit in the recess formed in a C-shaped element, whereby a plurality of said members and said C-shaped and T-shaped elements may be interconnected to form a joint having two oppositely facing C-shaped elements and two oppositely facing T-shaped elements including at least two such elements secured to the ends of said members, said elements of the same shape being in end-to-end relationship with each other and the node of a C-shaped element being positioned within the notch of a T-shaped element and the adjacent lobe of said last T-shaped element being positioned in the recess associated with said node of such C-shaped element.

5. An interlocking joint to connect the edges of horizontal and vertical planar members comprising in combination: a pair of first elongate elements each having a C-shaped cross section normal to the longitudinal axis of said element comprising a body portion having an interior surface and a posterior surface, said posterior surface adapted to be secured to the edge of one of said planar members with said edge parallel to the longitudinal axis of the element; a neck portion formed at each end of said body portion, each said neck portion secured at one end to said interior surface and extending away from the body portion in a direction normal to the interior surface; a node portion formed at the other end of each said neck portion of the C, the exterior terminus of one said mode facing the exterior terminus of the other node with said termini separated from each other by a predetermined interval, and a recess defined at each end of said body on the side of the interior surface thereof by each of said nodes and adjacent portions of said necks and the body; and a pair of second elongate elements each having a T-shaped cross section normal to the longitudinal axis of said second elements comprising a stem portion having first and second opposite ends, said first end adapted to be secured to the edge of another of said planar members with said last edge parallel to the longitudinal axis of said second element, and a crossbar portion secured at the mid section thereof to said second end of the stem with the longitudinal axis of said bar normal to the longitudinal axis of said stem, said crossbar thickness in a direction normal to the longitudinal axis thereof being at least no greater than about one-half of said predetermined interval between the termini of the nodes of said C-shaped element, and a lobe formed at each end of said crossbar extending in a direction parallel to the longitudinal axis of said stem and toward the first end thereof, each said lobe defining a notch on each side of said stem between the lobe and adjacent portions of said crossbar and the stem, a node of a C-shaped element being shaped to fit in a notch formed in one of said T-shaped elements and the lobe associated with said notch of the T-shaped elements and the lobe associated with said notch of the T-shaped element being shaped to fit in the recess associated with said node formed in such C-shaped element.

6. The components for an interlocking joint to connect the ends of at least two members comprising: a pair of T-shaped elements each having a stem portion with one end adapted for attachment to one end of one of said members, a crossbar secured at the mid section thereof to the other end of the stem and perpendicular thereto, first and second lobes each formed at an opposite end of said crossbar and extending in a direction parallel to said stem and toward the base thereof, and a notch defined on each side of said stem by said lobe and adjacent portions of said crossbar and stem; and a pair of C-shaped elements each comprising a body having an interior surface and a posterior surface formed on opposite sides of said body, said posterior surface adapted for attachment to one end of another of said members to be connected, first and second necks each having one end secured to said interior surface at the opposite ends of said body and extending in a direction generally normal to the interior surface, a node formed on the other end of each said neck, said nodes being in longitudinal alignment with each other with the free ends of the nodes facing each other and spaced apart a distance equal to about twice the thickness of the crossbar of said T-shaped element measured parallel to the longitudinal axis of said stem, and a recess defined at each end of said body by each of said nodes and adjacent portions of one of said necks and body, a node of a C-shaped element shaped to fit in a notch formed in one of said T-shaped elements, and the lobe associated with said notch of the one T-shaped element shaped to fit in the recess associated with said node formed in such C-shaped element, whereby said pair of T-shaped elements may be positioned with crossbars touching and the longitudinal axes of said stems and lobes in co-axial alignment, and said pair of said C-shaped elements positioned with each node nested in a separate one of said notches.

References Cited
UNITED STATES PATENTS

| | | | |
|---|---|---|---|
| 1,918,116 | 7/1933 | Mansfield | 287—54 |
| 2,590,720 | 3/1952 | Mayer | 287—189.36 |
| 2,931,467 | 4/1960 | Fentiman | 287—189.36 |
| 2,937,471 | 5/1960 | Parisi | 287—189.36 X |
| 2,976,968 | 3/1961 | Fentiman | 287—189.36 |
| 3,002,591 | 10/1961 | Hess | 52—496 |
| 3,036,671 | 5/1962 | Seipos | 52—663 |
| 3,086,629 | 4/1963 | Blitzer | 52—663 |
| 3,125,196 | 3/1964 | Fenner | 52—473 |

CARL W. TOMLIN, *Primary Examiner.*

W. L. SHEDD, *Assistant Examiner.*